(12) United States Patent
Narasimhamurthy (10) Patent No.: US 9,483,323 B2
(45) Date of Patent: Nov. 1, 2016

(54) READ AND WRITE OPERATIONS ON SHARED DATA RESOURCES IN PARALLEL PROCESSING SYSTEMS

(71) Applicant: Oracle International Corporation, Redwood Shores, CA (US)

(72) Inventor: Giridhar Narasimhamurthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 200 days.

(21) Appl. No.: 14/246,158

(22) Filed: Apr. 7, 2014

(65) Prior Publication Data
US 2015/0286563 A1   Oct. 8, 2015

(51) Int. Cl.
*G06F 9/52*   (2006.01)
(52) U.S. Cl.
CPC ...................................... *G06F 9/52* (2013.01)
(58) Field of Classification Search
CPC ............................................... G06F 17/30893
See application file for complete search history.

(56) References Cited

U.S. PATENT DOCUMENTS

| | | | |
|---|---|---|---|
| 7,676,664 B2* | 3/2010 | Kissell | 712/244 |
| 8,112,594 B2* | 2/2012 | Giacomoni et al. | 711/154 |
| 2010/0121839 A1* | 5/2010 | Meyer et al. | 707/720 |

* cited by examiner

*Primary Examiner* — Ayaz Sheikh
*Assistant Examiner* — Debebe Asefa
(74) *Attorney, Agent, or Firm* — IPHorizons PLLC; Narendra Reddy Thappeta (57) ABSTRACT

Providing unblocked read operations concurrent with write operations with respect to shared data resources in parallel processing systems. In an embodiment, for each data resource, a pair of fields and an index field is maintained. The index field indicates which of the two fields (e.g., first field) stores a current value for the data resource. However, when a new value is to be stored for the data resource, the value is first stored in the second field using a execution entity, while ensuring exclusive access for the execution entity to the second field. The index field is then updated to indicate that the second field stores the current value, such that the new value in the second field is thereafter available as the current value for read operations. All read operations by any corresponding concurrent execution entities, during the write operation, are continued unblocked.

20 Claims, 8 Drawing Sheets

READ AND WRITE OPERATIONS ON SHARED DATA RESOURCES IN PARALLEL PROCESSING SYSTEMS

RELATED APPLICATIONS

The present application is related to the following co-pending applications, which are both incorporated in their entirety into the present application:

1. Entitled, "Reducing Blocking Instances in Parallel Processing Systems Performing Operations on Trees", Ser. No. 14/246,159, Filed on even date herewith, naming as inventors GIRIDHAR NARASIMHAMURTHY and BHARADWAJ GOSUKONDA.

2. Entitled, "Neighbor Lookup Operations in a Network Node", Ser. No 14/246,160, Filed on even date herewith, naming as inventors GIRIDHAR NARASIMHAMURTHY and BHARADWAJ GOSUKONDA.

BACKGROUND OF THE DISCLOSURE

1. Technical Field

The present disclosure relates to parallel processing systems, and more specifically to read and write operations on shared resources in such parallel processing systems.

2. Related Art

A parallel processing system generally refers to a system in which multiple execution entities operate in parallel or concurrently in processing various data resources (or values for corresponding entities). For example, a system may contain multiple processors operating independently to provide many threads, with several threads executing concurrently on corresponding data resources.

A data resource is said to be shared when multiple execution entities may need to operate on the same data resource, in potential durations that can overlap. Particular challenges are presented when the shared resource is sought to be modified (or written) by one or more of the execution entities.

Aspects of the present disclosure provide advantageous approaches to read and write operations on shared data resources in parallel processing systems.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides unblocked read operations concurrent with write operations with respect to shared data resources in parallel processing systems. In an embodiment, for each data resource, a pair of fields and an index field is maintained. The index field generally indicates which ("current field") of the two fields (e.g., first field to start with) of the pair stores a current value for the data resource. The value of the current field is the value returned by read operations.

However, when a new value is to be stored for the data resource, the value is first stored in an alternate field (i.e., other than the current field—second field) of the pair using an execution entity, while ensuring exclusive access for the execution entity to the alternate field. The index field is then updated to switch the roles of the current field and alternate field such that the new value in the second field is thereafter available as the current value for read operations.

All read operations by corresponding concurrent execution entities, in the duration when changes are made to the second field (alternate field) and the index field, are continued unblocked (i.e., without being blocked by the exclusive access). In such an duration, the read operations causes retrieval of the value in the first field (current field), while the value in the second field (alternate field) is retrieved for subsequent read operations after index field is updated.

The approach can be employed with respect to fields of several types of data structures. In an embodiment, an additional pair of fields and another index field is similarly provided for a pointer field used for linked lists. As a result, when nodes are being added or removed, the traversal (read operations) of the linked list continues unblocked.

In an embodiment, the linked list structure is used to store mapping entries of a neighbor table, with each entry indicating the mapping from an IP address to a corresponding MAC address. Given that the higher layers are designed to be tolerant to incorrect/inconsistent views of such mapping information for a short duration temporarily, such a fact is taken advantage of to provide unblocked read requests, for a correspondingly high throughput performance.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
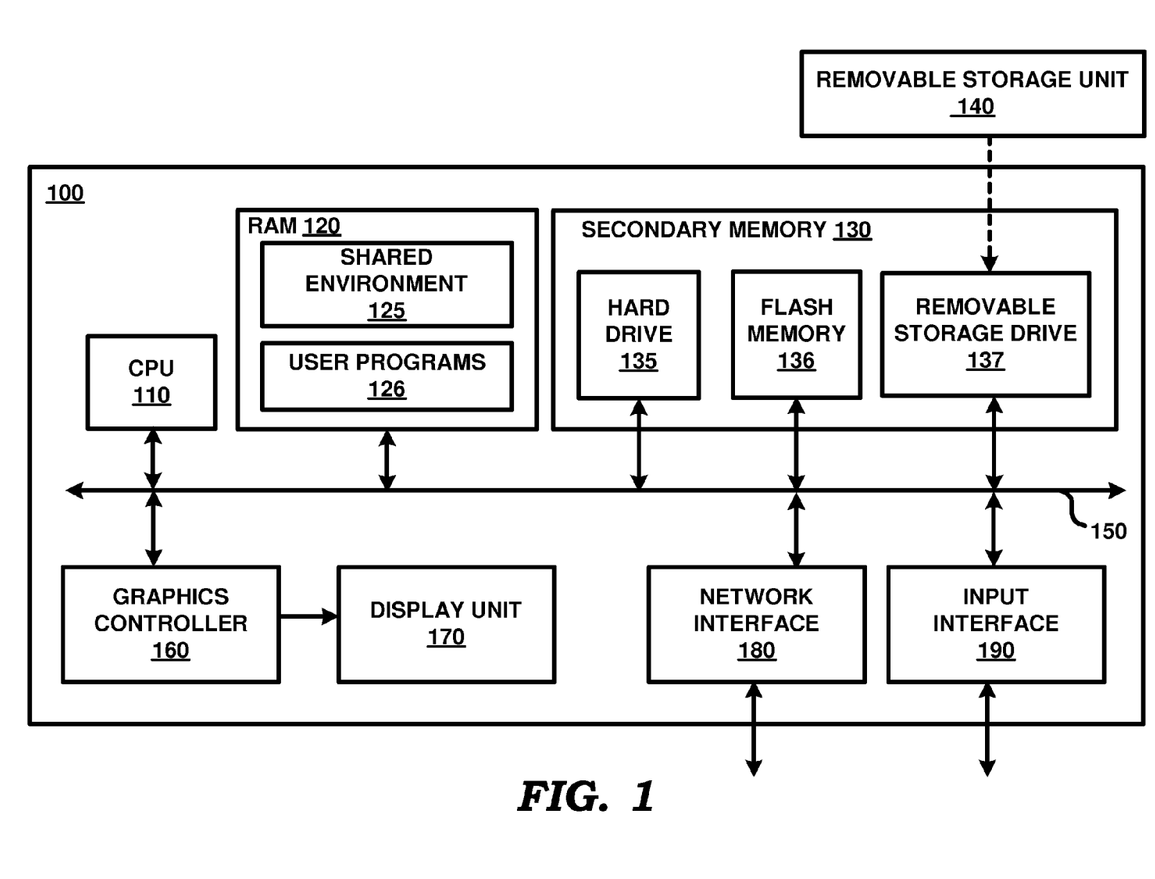
FIG. 1 is a block diagram illustrating the details of a digital processing system in which various aspects of the present disclosure are operative by execution of appropriate executable modules.

FIG. 1 is a block diagram illustrating the details of digital processing system 100 in which various aspects of the present disclosure are operative by execution of appropriate executable modules. Digital processing system 100 may contain one or more processors such as a central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present disclosure. CPU 110 may contain multiple processing units, with each processing unit potentially being designed for a specific task. Merely for illustration, it is assumed that CPU 110 contains multiple processors which can execute in parallel to create various concurrently executing threads (examples of execution entities), at least some of which may access shared data resources. Alternatively, CPU 110 may contain only a single processing unit, which also provides concurrent threads. In such a scenario, concurrent execution entities may be implemented, for example, using time-slicing techniques well known in the relevant arts.

RAM 120 may receive instructions from secondary memory 130 using communication path 150. RAM 120 is shown currently containing software instructions constituting operating environment 125 and/or other user programs 126. In addition to operating environment 125, RAM 120 may contain other software programs such as device drivers, virtual machines, etc., which provide a (common) run time environment for execution of other/user programs. The shared data resources may be stored in RAM 120. Though shown as a single unit usable by CPU 110, RAM 120 may be viewed as containing multiple units, with some of the units being contained in specific components (e.g., network interface 180) to store the shared resources accessed in accordance with the features of the present disclosure.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and a pointing device (e.g., touch-pad, mouse) and may be used to provide inputs.

Secondary memory 130 may contain hard drive 135, flash memory 136, and removable storage drive 137. Secondary memory 130 may store the data (for example, the nodes of the linked list of FIGS. 3A-3D, 4A-4E and 5A-5D) and software instructions (for implementing the steps of FIG. 2), which enable digital processing system 100 to provide several features in accordance with the present disclosure. The code/instructions stored in secondary memory 130 may either be copied to RAM 120 prior to execution by CPU 110 for higher execution speeds, or may be directly executed by CPU 110.

Some or all of the data and instructions may be provided on removable storage unit 140, and the data and instructions may be read and provided by removable storage drive 137 to CPU 110. Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 130. Volatile media includes dynamic memory, such as RAM 120. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 150. Transmission media can also take the form of acoustic or light waves, such as those generated during radio-wave and infra-red data communications.

Network interface 180 provides connectivity to a network and may be used to communicate with other systems connected to the network (not shown). The network may be implemented according to Internet Protocol (IP), and according to aspects of the present disclosure the shared data resources may correspond to entries which translate each IP address to corresponding Ethernet Address (MAC address, in general). As may be appreciated, the IP protocol is tolerant to transient inconsistencies of incorrect mappings (or stale data). Aspects of the present disclosure take advantage of such situation to provide non-blocking read requests, as described below with examples.

3. Non-Blocking Read Operations in the Presence of Write Operations

Figure 2:
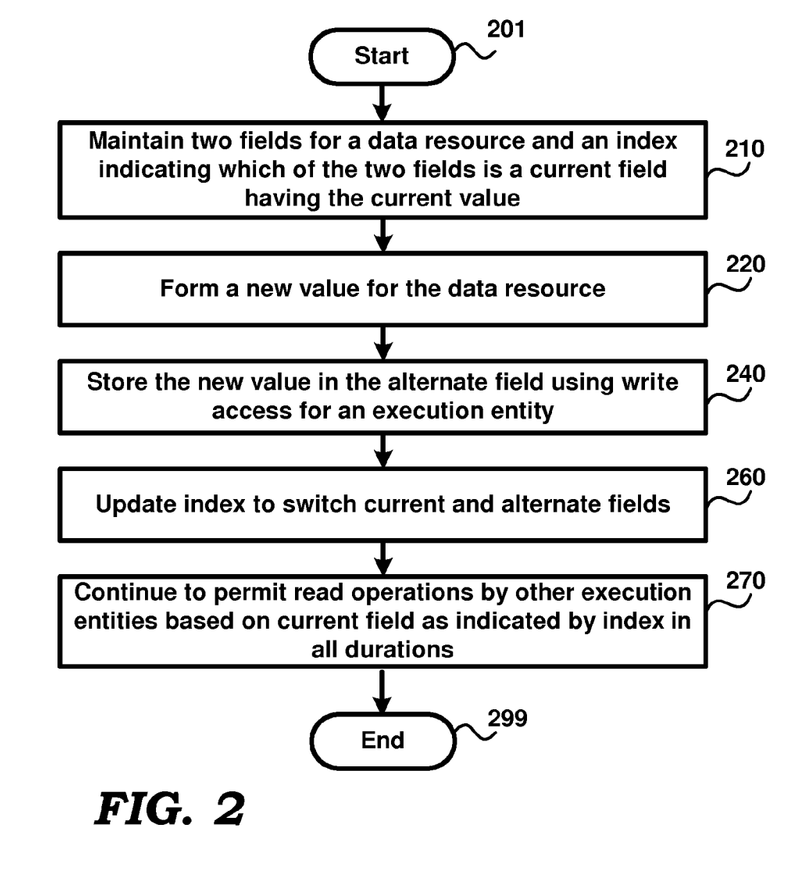
FIG. 2 is a flow chart illustrating the manner in which unblocked read operations may be performed concurrent with write operations, according to an aspect of the present disclosure.

FIG. 2 is a flow chart illustrating the manner in which read and write operations on shared resources in parallel processing systems is facilitated according to an aspect of the present disclosure. The flowchart is described with respect to the digital processing system of FIG. 1, in particular, CPU 110, merely for illustration. However, the features can be implemented in other systems, components (e.g., in network interface 180) and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, CPU 110 maintains two fields for a data resource and an index indicating which of the two fields is a current field having the current value. As described below, only one of the two fields contains the current value at any given time instance, and the index indicates which of the two fields is the current field containing the current value at that instance (point of time).

In step 220, CPU 110 forms a new value for the data resource. The new value may be formed by either generating such value based on various processing operations (performed by CPU 110), or simply received from an external component or system.

In step 240, CPU 110 stores the new value in the alternate field while providing write access to the alternate field for an execution entity. In an embodiment, all write operations are channeled via a single execution entity. Alternatively, in case write operations are performed by multiple concurrent execution entities, an exclusive write access may be granted before permitting any execution entity to perform a corresponding write operation. The exclusive write access may be implemented using write locks well known in the relevant arts Implementation of a write lock implies that other execution entities can access the alternate field for neither read operations nor (other) write operations until the write lock is released. However, if all write operations are performed sequentially by a single execution entity, such write locks may not be necessary.

In step 260, CPU 110 updates the index to switch current and alternate fields. In other words, the alternate field (which has been stored the new value in step 240) is made the current field by changing the value of the index. The same thread (execution entity) storing new value in the alternate field (step 240) may also update the index, while having exclusive access to the alternate field, similar to in step 240.

In step 270, CPU 110 continues to permit read operations by other execution entities based on current field as indicated by index in all durations of above, i.e., including even during value updates of step 240 (and also 260). That is, even in the duration in which an execution entity updates (performs a write operation) in step 240, the read operations (by corresponding concurrent execution entities) are continued without being blocked. As briefly noted above, the write lock may not be necessary in case a single execution entity is used for all write operations, and thus read operations can continued unblocked in the duration the write/update operations are complete as well.

As the read operations are continued without blocking, CPU 110 may be able to meet any (high) desired performance throughput requirements in corresponding environments. The flow chart ends in step 299.

It may be further appreciated that two fields are thus provided for a shared data resource, with one field being used for read operations and the other being used for write operations. Upon completion of the write operation, that field is switched for the read operation, and the previously used field for the read operation is made available for subsequent write operations. Each write operation is implemented using locks for exclusive access (in case of multiple concurrent execution entities/threads performing write operations), while the concurrent read operations are continued without being blocked.

The features of above can be applied in various contexts and an example context is described below in further detail.

4. Illustrative Examples

FIGS. 3A-3E together illustrates the manner in which values may be maintained as a linked list. The pointers forming the basis for the linked lists as well as the values which can be modified constitute shared data resources.

Each of the FIGS. 3A-3D shows three values being stored in corresponding nodes 311-313 (data structure) organized as a linked list. The memory address where each node is stored is shown to the left of the node (e.g., 7100, 7200 and 7300). The head-pointer is shown pointing to the first node (at memory address 7100) of the linked list.

Each node is shown containing six fields. Value1 and Value2 are the two fields for storing a data value, with VIndex indicating the specific one of the fields storing the data value. According to a convention, a value of 0 for VIndex (implemented as a single bit) indicates that Value1 currently contains the value (as shown), while a value of 1 for VIndex indicates that Value2 currently contains the data value. Similarly, Pointer1 and Pointer2 are two fields for storing a pointer to the next node in the linked list, with PIndex indicating the specific one of the two fields storing the pointer. Some of the Pointer1 and Pointer2 fields are shown set to the value "null" (which represents a pre-defined value, for example, the value "0") to indicate that the pointer does not point to/refer to a valid node, as is well known in the relevant arts.

Though the head pointer is shown as a single field for conciseness, it should be appreciated that in alternative embodiments, the head pointer can also be implemented as three fields (current field, alternative field, and index) consistent with the features of the present disclosure for the individual values of each node. Such an implementation may be used when it is desirable to provide unblocked chain traversal (including read operation of the value in the head pointer) even when the pointer value of the head pointer could be modified.

Figure 3A:
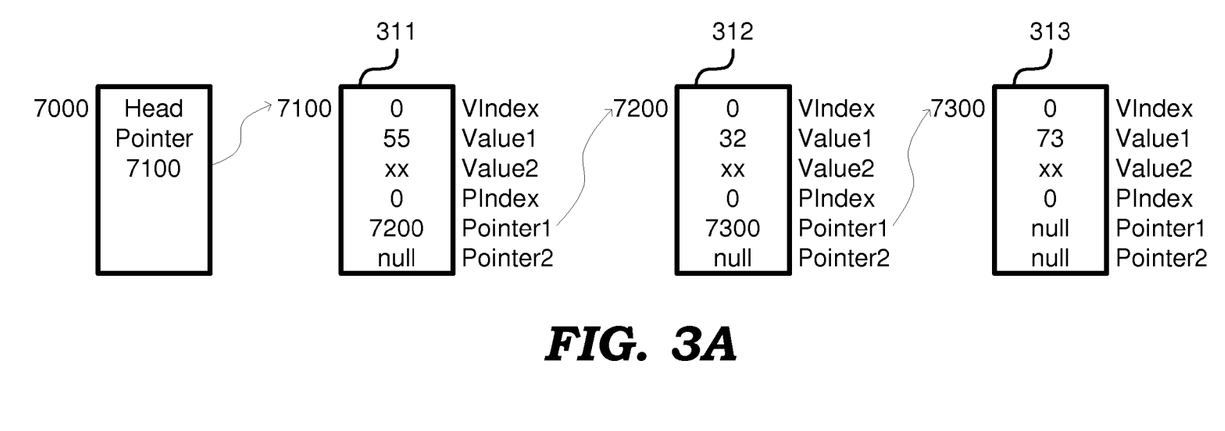
FIGS. 3A-3D depict the status of nodes at respective time instances illustrating the manner in which a data resource can be modified to a new value, while permitting unblocked read operations for concurrent execution entities according to an aspect of the present disclosure.
Figure 3B:
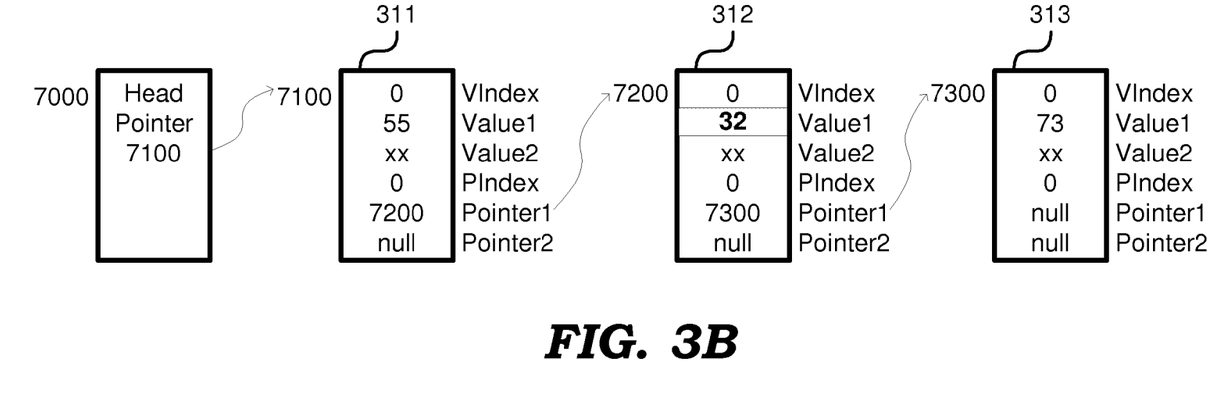
Figure 3C:
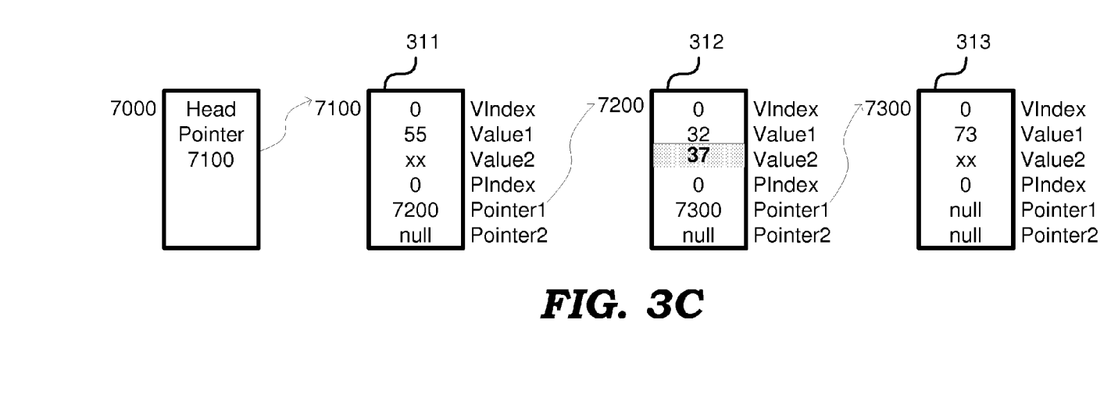
Figure 3D:
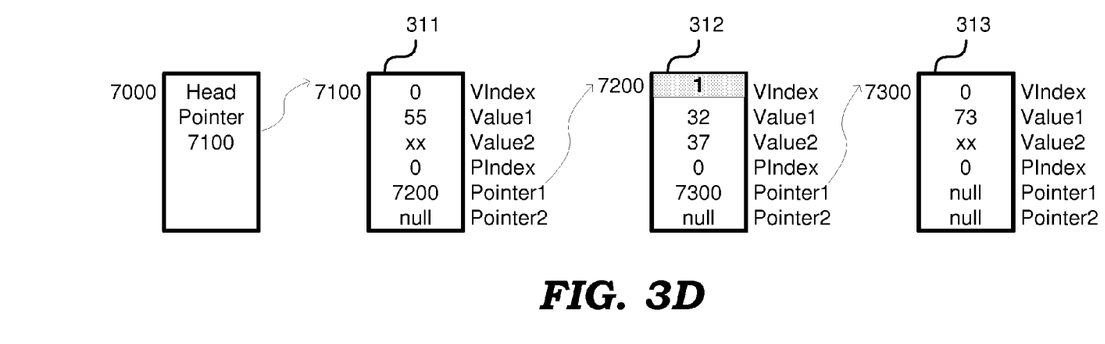
Figure 3E:
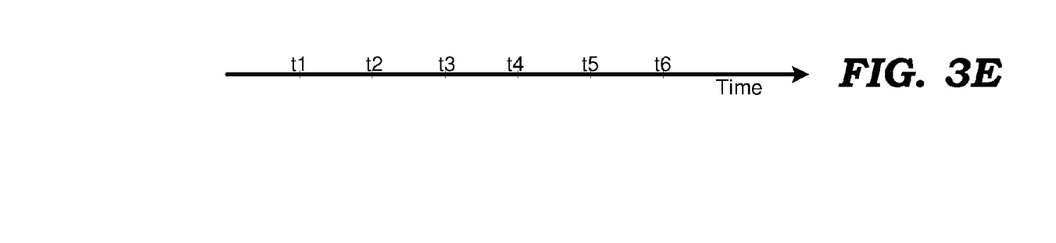
FIG. 3E is a timeline illustrating the relative time instances at which various operations may be performed in changing the value of a field.

FIG. 3A represents the status of the linked list at time instance t1 (shown in FIG. 3E). Due to the value of 0 in the VIndex of all nodes, Value1 contains the corresponding values (55, 32 and 73) of the linked list. It is now assumed that a field with current value of 32 in node 312 is to be modified to a new value of 37. FIG. 3B shows the value 32 in bold font (and also surrounded by a rectangle), representing that that the node has been identified at time instance t2 (FIG. 3E) by traversing the linked list.

To effect the write operation, a write lock (for node 312) is acquired at time instance t3 (to avoid other execution entities/threads from attempting to perform a parallel update), and the new value 37 is shown written in Value2 of node 312 at address 7200 in FIG. 3C by time instance t4. VIndex field of the same node is shown updated to 1 in FIG. 3D by time instance t5. The write lock is released by time instance t6.

It may thus be appreciated that the read operation (or the execution entity/thread performing the read operation) continues unblocked in the entire duration (including t1-t6) even while the locked write operation is in progress (duration t3-t6) in a corresponding execution entity. The read operations prior to t5 return a value of 32 for the node at 7200, while after t5 a value of 37 is returned for the same node. Unblocked read operations are similarly provided even when the nodes are removed or inserted, as described below with examples.

5. Node Insertion

FIGS. 4A-4E represents status of content of various nodes at respective sequence of time instances (say t11-t15) similar to the sequence shown in FIG. 3E. The Figures together are used to illustrate that traversal of linked list can continue without blocking (lock) operations, even when a node is inserted into the linked list.

Figure 4A:
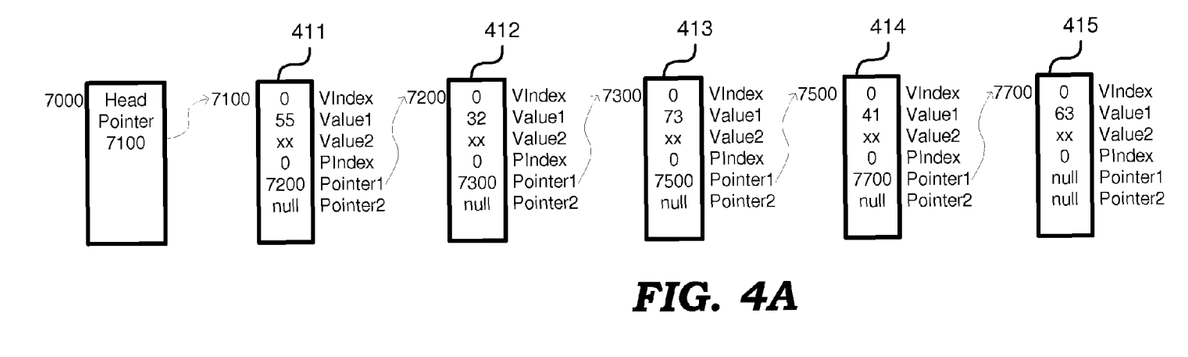
FIGS. 4A-4E depicts the status of nodes at respective time instances illustrating the manner in which a node can be inserted according to an aspect of the present disclosure.
Figure 4B:
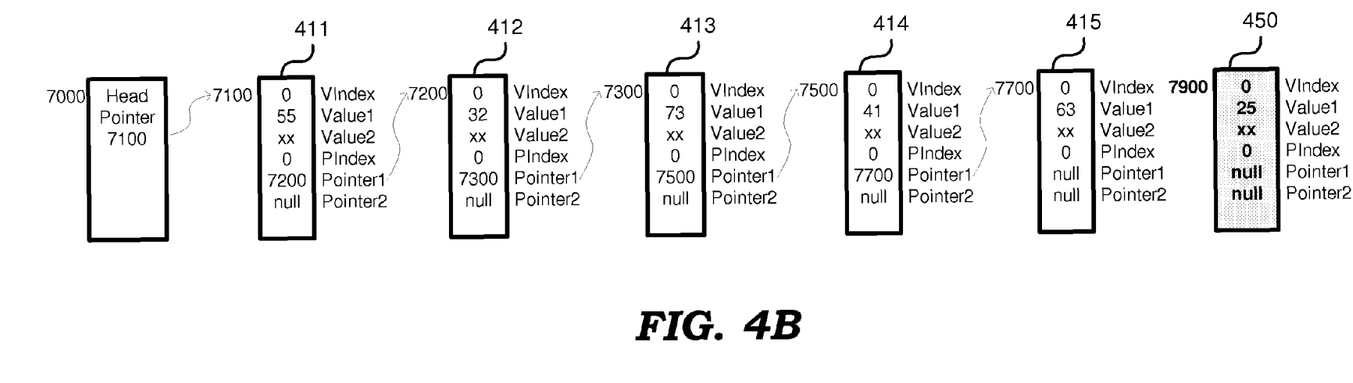
Figure 4C:
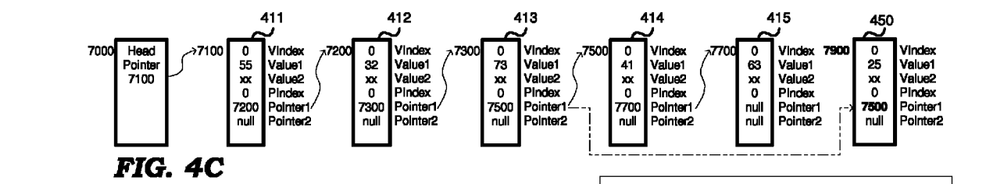

FIG. 4A depicts a linked list of 5 nodes 411-415 (at time instance t11), with each node having six fields, similar to in FIG. 3A-3D. FIG. 4B (at time instance t12) depicts a new node 450 (with corresponding value 25) sought to be inserted between nodes 413 and 414, for whatever reason. FIG. 4C (at time instance t13) depicts pointer value 7500 (i.e., the memory address of the next node, after the intended insertion) having been copied into pointer 1 field of node 450 (shown with a broken line as to the source of the data). The PIndex value of node 450 is shown set to 0 indicating that the Pointer1 field contains the current value for node 450 (and accordingly, points to node 414).

The node thus created is sought to be hereafter inserted into the linked list as described below. An exclusive write lock on shared data resource (Pointer2 and PIndex of node 413) is obtained from hereon (i.e., before the start of the operation described below with respect to FIG. 4D) to effect such insertion.

Figure 4D:
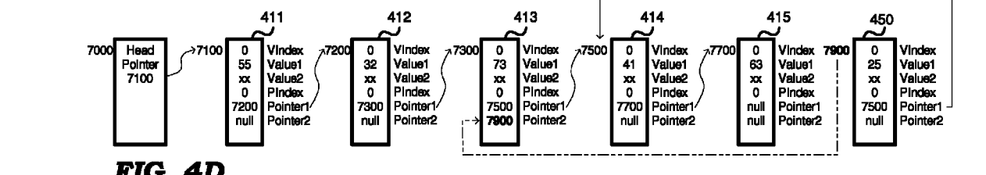
Figure 4E:
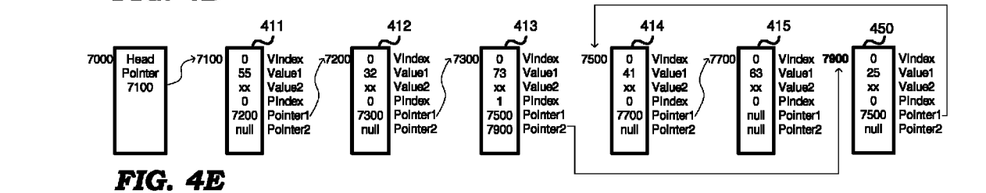

FIG. 4D (at time instance t14) depicts Pointer2 field of node 413 set to pointer value 7900 (equaling the memory location address of the new node, as shown with the dotted line). FIG. 4E (at time instance t15) depicts the PIndex field of node 413 set to 1, to indicate that Pointer2 is hereafter operative for read operations. The write lock is released (say time instance t16) soon after the Pindex is modified to 1.

Thus prior to the update shown at t15, the insertion is not seen and thus traversal (read operations of the pointer values) of the linked list causes access of nodes 411-415 to be accessed. On the other hand, from the update shown at t15 onwards, the node traversal is 411, 412, 413, 450, 414 and 415. Both types of traversals (including in the duration of the exclusive write lock) continue unblocked in view of the use of the two fields, as described herein.

The description is continued with respect to removal of a node in an embodiment of the present disclosure.

6. Node Removal

FIGS. 5A-5D represents status of content of various nodes at respective sequence of time instances (say t21-t26) similar to the sequence shown in FIG. 3E. The Figures together are used to illustrate that traversal of linked list can continue without blocking (lock) operations, even in a duration a node is removed (or corresponding fields are locked) from the linked list.

Figure 5A:
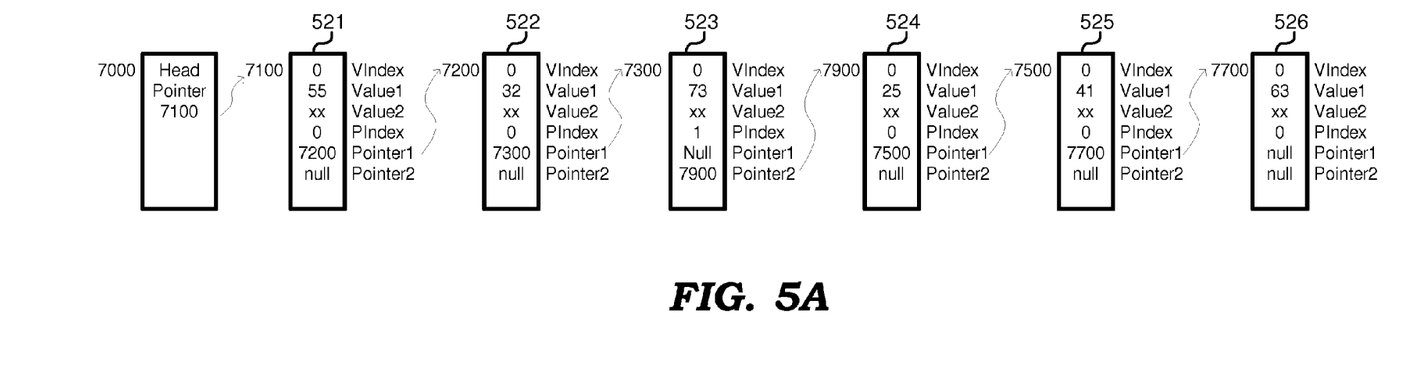
FIGS. 5A-5D depicts the status of nodes at respective time instances illustrating the manner in which a node can be removed according to an aspect of the present disclosure.
Figure 5B:
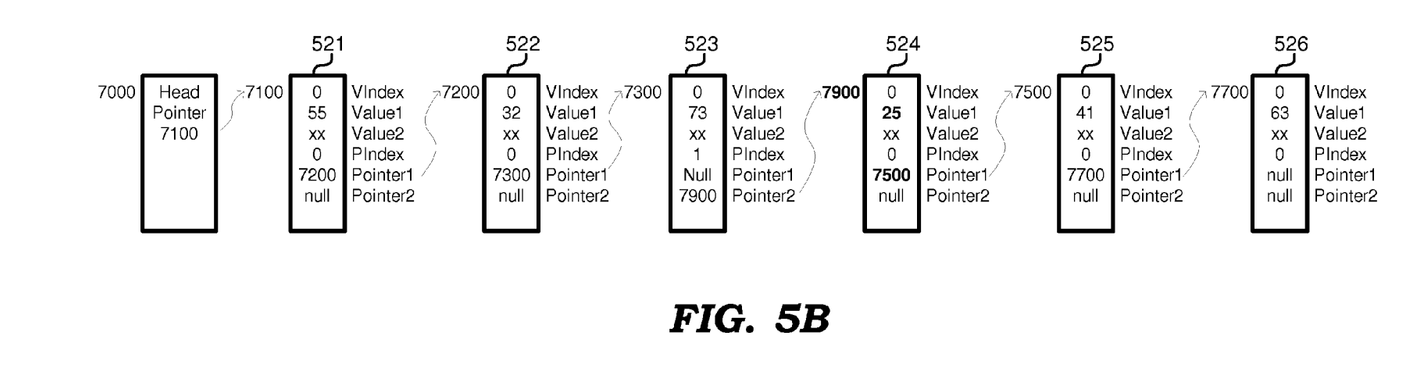
Figure 5C:
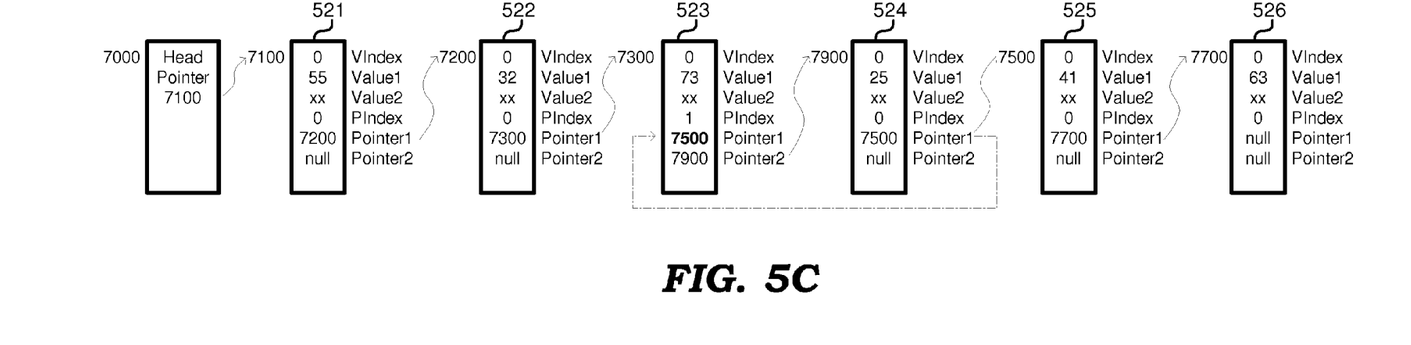

FIG. 5A depicts a linked list of 6 nodes 521-526 (at time instance t21), with each node having six fields, similar to in FIG. 3A-3D. FIG. 5B (at time instance t22) depicts node 524 (with corresponding value 25) sought to be removed from in between nodes 523 and 525, for whatever reason. FIG. 5C (at time instance t23) depicts pointer value 7500 (i.e., the memory address of the next node, after the intended removal). An exclusive write lock on shared data resource (Pointer1 and PIndex of node 523) is obtained (at time instance t24) from hereon, 7500 has been copied into Pointer1 field of node 523 (shown with a broken line as to the source of the data). The PIndex value is shown set to 1 indicating that the Pointer2 field contains the current value for node 524. Node 524 thus is sought to be hereafter removed from the linked list as described below.

Figure 5D:
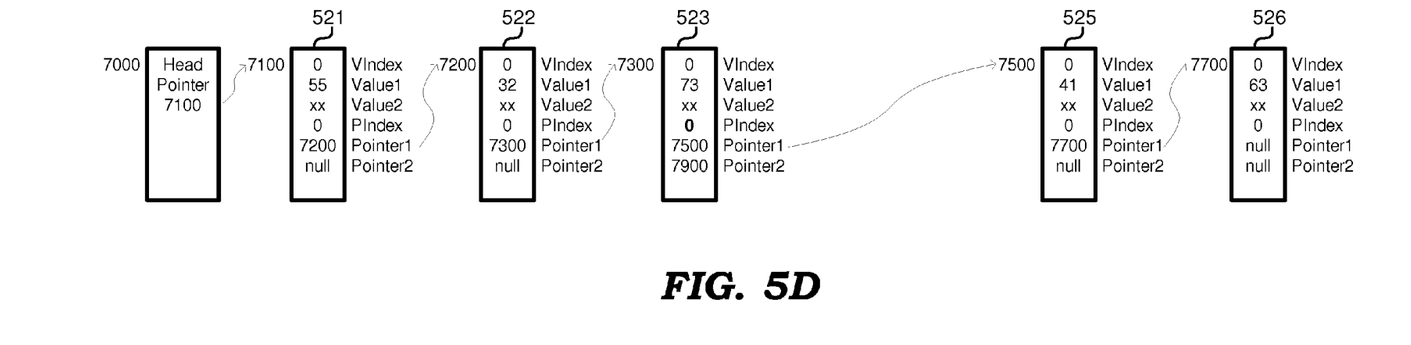

FIG. 5D depicts Pointer1 field of node 523 set to pointer value 7500 (equaling the memory location address of the node 525), depicts the PIndex field of node 523 set to 0 (say time instance t25), to indicate that Pointer1 is hereafter operative for read operations. The write lock is released (say time instance t26) soon after the PIndex is modified to 0.

Thus prior to the update shown at t25, the removal is not seen and thus traversal (read operations of the pointer values) of the linked list causes access of nodes 521-526 to be accessed. On the other hand, after the update shown at t25 onwards, the node traversal is 521, 522, 523, 525 and 526. Both types of traversals (including in the duration of the exclusive write lock) continue unblocked in view of the use of the two fields, as described. In other words, concurrent read operations (for traversal of the linked lists) continues unblocked, even in the duration of the write operations (whether blocked or unblocked) forming the basis for removal of nodes.

To accommodate references to 524 that have already been stored, the release of 524 to free memory pool is performed after a certain "grace period" as appropriate to the execution environment. Until the grace period is complete, execution entities/threads that have already obtained the reference to 7900 will see the list as 524,525,526. One example of a grace period is a timeout beyond which the design ensures that there is no reference to the node being deleted.

Though the above noted transactions are described with respect to read operations, it should be appreciated that the multiple concurrent threads executing the corresponding read operations or node traversals (in FIGS. 3A-3D, 4A-4E, 5A-5D) continue unblocked whether or not there is a concurrent write operation (in corresponding thread) in progress.

7. Example Use Cases

It should be appreciated that the linked list is merely an example data structure in which the features of the flowchart of FIG. 2 can be implemented. However, the features can be extended to other data structures such as bi-directional linked lists, binary trees, graphs, etc., as will be apparent one skilled in the relevant arts by reading the disclosure herein.

Furthermore, any of such data structures can be employed in various contexts such as operating systems, etc., as will also be apparent to one skilled in the relevant arts by reading the disclosure provided here.

In an embodiment described in further detail in the related applications noted above, digital processing system 100 communicates on a network using Internet Protocol (IP). As is well known, IP implementations (for example, based on IPv6 protocol) use a neighbor table, which contain multiple mapping entries, with each mapping entry providing translation of an IP address to a MAC (Media access control) layer address.

The mapping entries may be partitioned into multiple subsets (for example, as different buckets of a hash table based on a hash function), and each subset may be stored in the form of some of the data structures noted above, but using a linked list. Thus, the approaches described above may be used, with each node extended to store information for a corresponding mapping entry. The shared data resource (Value1/Value2) may store the MAC address (which is subject to change), and another fixed field (e.g., named Key) is added to the node to store the IP address (which does not change).

It may thus be appreciated that the MAC address provided for read operation represents a stale value in the duration of concurrent write operation with the new correct value. However, as TCP/IP protocol is generally tolerant to such occasional inconsistencies, the non-blocking read operations provided according to aspects of the present disclosure may provide a desired high throughput performance at the risk of occasional incorrect value for read operations.

It should be appreciated that the features described above can be implemented in various embodiments as a desired combination of one or more of hardware, executable modules, and firmware.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of performing read and write operations on shared data resources in parallel processing systems, said method comprising:

maintaining a first pair of fields and a first index field for a first data resource, wherein said first pair of fields includes a first field and a second field, wherein said first index field is designed to indicate which of said first field and said second field is a current field storing a current value for said first data resource, said first field to store a first value for said first data resource at a first time instance, said first index field indicating that said first field is said current field at said first time instance such that said first value stored in said first field represents said current value for said first data resource at said first time instance;

forming a second value for said first data resource at a second time instance;

storing said second value in said second field using a first execution entity, while ensuring exclusive write access to said first execution entity for writing said second value to said second field, wherein said first index field is set by a third time instance to indicate that said second field is said current field such that said second value stored in said second field represents said current value for said first data resource after said third time instance;

permitting read operations unblocked in corresponding set of execution entities to access the value indicated by said first index field as the corresponding current value of said first data resource in a duration between said second time instance and said third time instance;

forming a third value for said first data resource at a fourth time instance;

storing said third value in said first field using a second execution entity, while ensuring exclusive write access to said second execution entity for writing said third value to said first field, wherein said first index field is set by a fifth time instance to indicate that said first field is said current field such that said third value stored in said first field represents said current value for said first data resource after said fifth time instance; and permitting read operations unblocked in corresponding set of execution entities to access the value indicated by said first index field as the corresponding current value of said first data resource in a duration between said fourth time instance and said fifth time instance.

2. The method of claim 1, wherein each of said first execution entity and said set of execution entities comprises a corresponding thread of a plurality of threads.

3. The method of claim 2, wherein said plurality of threads are formed by a plurality of processors executing in parallel.

4. The method of claim 1, wherein said first execution entity also performs said setting of said first index field to indicate that said second field is said current field, wherein said exclusive write access is ensured to said first execution entity for setting of said first index field also.

5. The method of claim 1, wherein said first data resource is one of a sequence of data resources maintained as a linked list, said linked list being formed based on a sequence of nodes, said first pair of fields and said first index field being contained in a first node of said sequence of nodes, said first data resource being a resource value of an object, said maintaining also maintains a second pair of fields and a second index field in said first node, said second pair of fields containing a fourth field and a fifth field to store a pointer, said pointer to point to a second node, wherein said second node is a next node following said first node in said sequence of nodes, said second index field for indicating which of said second pair of fields is currently storing a pointer value to point to said next node, said second index field indicating that said fourth field contains said pointer value at a fourth time instance.

6. The method of claim 5, to remove said second node from said linked list, said method further comprising:

identifying a second pointer value in said second node, said second pointer value pointing to an immediate node after said second node in said sequence of nodes of said linked list;

storing said second pointer value in said fifth field of said first node using a third execution entity, while providing exclusive write access to said third execution entity for writing said second pointer value to said fifth field, wherein said second index field is thereafter set to indicate that said fifth field stores said pointer, wherein said second pointer value is stored in said fifth field and said second index field is set to indicate that said fifth field stores said pointer by a fifth time instance; and permitting traversal of said first node unblocked for purpose of read operations based on the pointer value in said fourth field or said fifth field as indicated by said second index field, such that said second node is traversed to be said next node to said first node until said fifth time instance, and said immediate node after said second node is traversed to be said next node to said first node after said fifth time instance.

7. The method of claim 5, to insert a third node between said first node and said second node in said linked list, said method further comprising:

identifying a third pointer value in said pointer of said first node at said fourth time instance, said third pointer value pointing to said second node indicating that said second node is said next node to said first node in said sequence of nodes of said linked list at said fourth time instance;

creating said third node at a memory address, with said third node pointing to said second node;

storing said memory address in said fifth field using a third execution entity, while providing exclusive write access to said third execution entity for writing said memory address to said fifth field, wherein said second index field is thereafter set to indicate that said fifth field stores said pointer by a sixth time instance; and permitting traversal of said first node unblocked for purpose of read operations based on the pointer value in said fourth field or said fifth field as indicated by said second index field, such that said second node is traversed to be said next node to said first node until said sixth time instance, and said third node is traversed to be said next node to said first node after said sixth time instance.

8. The method of claim 7, wherein each of said sequence of nodes including said first node contains sixth field to store an IP address, said resource value comprising a MAC (medium access control) address corresponding to said IP address such that translating each IP address to corresponding MAC address is performed based on unblocked read operations.

9. A non-transitory machine readable medium storing one or more sequences of instructions for enabling a system to perform read and write operations on shared data resources, wherein execution of said one or more instructions by one or more processors contained in said system enables said system to perform the actions of:

maintaining a first pair of fields and a first index field for a first data resource, wherein said first pair of fields includes a first field and a second field, wherein said first index field is designed to indicate which of said first field and said second field is a current field storing a current value for said first data resource, said first field to store a first value for said first data resource at a first time instance, said first index field indicating that said first field is said current field at said first time instance such that said first value stored in said first field represents said current value for said first data resource at said first time instance;

forming a second value for said first data resource at a second time instance;

storing said second value in said second field using a first execution entity, while ensuring exclusive write access to said first execution entity for writing said second value to said second field, wherein said first index field is set by a third time instance to indicate that said second field is said current field such that said second value stored in said second field represents said current value for said first data resource after said third time instance;

permitting read operations unblocked in corresponding set of execution entities to access the value indicated by said first index field as the corresponding current value of said first data resource in a duration between said second time instance and said third time instance;

forming a third value for said first data resource at a fourth time instance;

storing said third value in said first field using a second execution entity, while ensuring exclusive write access to said second execution entity for writing said third value to said first field, wherein said first index field is set by a fifth time instance to indicate that said first field is said current field such that said third value stored in said first field represents said current value for said first data resource after said fifth time instance; and permitting read operations unblocked in corresponding set of execution entities to access the value indicated by said first index field as the corresponding current value of said first data resource in a duration between said fourth time instance and said fifth time instance.

10. The machine readable medium of claim 9, wherein each of said first execution entity and said set of execution entities comprises a corresponding thread of a plurality of threads.

11. The machine readable medium of claim 9, wherein said first execution entity also performs said setting of said first index field to indicate that said second field is said current field, wherein said exclusive write access is ensured to said first execution entity for setting of said first index field also.

12. The machine readable medium of claim 9, wherein said first data resource is one of a sequence of data resources maintained as a linked list, said linked list being formed based on a sequence of nodes, said first pair of fields and said first index field being contained in a first node of said sequence of nodes, said first data resource being a resource value of an object, said maintaining also maintains a second pair of fields and a second index field in said first node, said second pair of fields containing a fourth field and a fifth field to store a pointer, said pointer to point to a second node, wherein said second node is a next node following said first node in said sequence of nodes, said second index field for indicating which of said second pair of fields is currently storing a pointer value to point to said next node, said second index field indicating that said fourth field contains said pointer value at a fourth time instance.

13. The machine readable medium of claim 12, to remove said second node from said linked list, further comprising one or more instructions for:

identifying a second pointer value in said second node, said second pointer value pointing to an immediate node after said second node in said sequence of nodes of said linked list;

storing said second pointer value in said fifth field of said first node using a third execution entity, while providing exclusive write access to said third execution entity for writing said second pointer value to said fifth field, wherein said second index field is thereafter set to indicate that said fifth field stores said pointer, wherein said second pointer value is stored in said fifth field and said second index field is set to indicate that said fifth field stores said pointer by a fifth time instance; and permitting traversal of said first node unblocked for purpose of read operations based on the pointer value in said fourth field or said fifth field as indicated by said second index field, such that said second node is traversed to be said next node to said first node until said fifth time instance, and said immediate node after said second node is traversed to be said next node to said first node after said fifth time instance.

14. The machine readable medium of claim 12, to insert a third node between said first node and said second node in said linked list, further comprising one or more instructions for:

identifying a third pointer value in said pointer of said first node at said fourth time instance, said third pointer value pointing to said second node indicating that said second node is said next node to said first node in said sequence of nodes of said linked list at said fourth time instance;

creating said third node at a memory address, with said third node pointing to said second node;

storing said memory address in said fifth field using a third execution entity, while providing exclusive write access to said third execution entity for writing said memory address to said fifth field, wherein said second index field is thereafter set to indicate that said fifth field stores said pointer by a sixth time instance; and permitting traversal of said first node unblocked for purpose of read operations based on the pointer value in said fourth field or said fifth field as indicated by said second index field, such that said second node is traversed to be said next node to said first node until said sixth time instance, and said third node is traversed to be said next node to said first node after said sixth time instance.

15. The machine readable medium of claim 14, wherein each of said sequence of nodes including said first node contains sixth field to store an IP address, said resource value comprising a MAC (medium access control) address corresponding to said IP address such that translating each IP address to corresponding MAC address is performed based on unblocked read operations.

16. A digital processing system comprising:
a processor;
a random access memory (RAM);
a machine readable medium to store one or more instructions, which when retrieved into said RAM and executed by said processor causes said digital processing system to perform read and write operations on shared data resources, said digital processing system performing the actions of:

maintaining a first pair of fields and a first index field for a first data resource, wherein said first pair of fields includes a first field and a second field, wherein said first index field is designed to indicate which of said first field and said second field is a current field storing a current value for said first data resource, said first field to store a first value for said first data resource at a first time instance, said first index field indicating that said first field is said current field at said first time instance such that said first value stored in said first field represents said current value for said first data resource at said first time instance;

forming a second value for said first data resource at a second time instance;

storing said second value in said second field using a first execution entity, while ensuring exclusive write access to said first execution entity for writing said second value to said second field, wherein said first index field is set by a third time instance to indicate that said second field is said current field such that said second value stored in said second field represents said current value for said first data resource after said third time instance;

permitting read operations unblocked in corresponding set of execution entities to access the value indicated by said first index field as the corresponding current value of said first data resource in a duration between said second time instance and said third time instance;

forming a third value for said first data resource at a fourth time instance;

storing said third value in said first field using a second execution entity, while ensuring exclusive write access to said second execution entity for writing said third value to said first field, wherein said first index field is set by a fifth time instance to indicate that said first field is said current field such that said third value stored in said first field represents said current value for said first data resource after said fifth time instance; and permitting read operations unblocked in corresponding set of execution entities to access the value indicated by said first index field as the corresponding current value of said first data resource in a duration between said fourth time instance and said fifth time instance.

17. The digital processing system of claim 16, wherein each of said first execution entity and said set of execution entities comprises a corresponding thread of a plurality of threads.

18. The digital processing system of claim 16, wherein said first data resource is one of a sequence of data resources maintained as a linked list, said linked list being formed based on a sequence of nodes, said first pair of fields and said first index field being contained in a first node of said sequence of nodes, said first data resource being a resource value of an object, said digital processing system also maintains a second pair of fields and a second index field in said first node, said second pair of fields containing a fourth field and a fifth field to store a pointer, said pointer to point to a second node, wherein said second node is a next node following said first node in said sequence of nodes, said second index field for indicating which of said second pair of fields is currently storing a pointer value to point to said next node, said second index field indicating that said fourth field contains said pointer value at a fourth time instance.

19. The digital processing system of claim 18, to remove said second node from said linked list, said digital processing system performing the actions of:

identifying a second pointer value in said second node, said second pointer value pointing to an immediate node after said second node in said sequence of nodes of said linked list;

storing said second pointer value in said fifth field of said first node using a third execution entity, while providing exclusive write access to said third execution entity for writing said second pointer value to said fifth field, wherein said second index field is thereafter set to indicate that said fifth field stores said pointer, wherein said second pointer value is stored in said fifth field and said second index field is set to indicate that said fifth field stores said pointer by a fifth time instance; and permitting traversal of said first node unblocked for purpose of read operations based on the pointer value in said fourth field or said fifth field as indicated by said second index field, such that said second node is traversed to be said next node to said first node until said fifth time instance, and said immediate node after said second node is traversed to be said next node to said first node after said fifth time instance.

20. The digital processing system of claim 18, to insert a third node between said first node and said second node in said linked list, said digital processing system performing the actions of:

identifying a third pointer value in said pointer of said first node at said fourth time instance, said third pointer value pointing to said second node indicating that said second node is said next node to said first node in said sequence of nodes of said linked list at said fourth time instance;

creating said third node at a memory address, with said third node pointing to said second node;

storing said memory address in said fifth field using a third execution entity, while providing exclusive write access to said third execution entity for writing said memory address to said fifth field, wherein said second index field is thereafter set to indicate that said fifth field stores said pointer by a sixth time instance; and permitting traversal of said first node unblocked for purpose of read operations based on the pointer value in said fourth field or said fifth field as indicated by said second index field, such that said second node is traversed to be said next node to said first node until said sixth time instance, and said third node is traversed to be said next node to said first node after said sixth time instance.

* * * * *